(12) United States Patent
Takemoto et al.

(10) Patent No.: US 7,770,481 B2
(45) Date of Patent: Aug. 10, 2010

(54) SHIFT DRUM APPARATUS AND TRANSMISSION INCLUDING SAME

(75) Inventors: Kazuhisa Takemoto, Saitama (JP); Masafumi Taki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 447 days.

(21) Appl. No.: 11/724,099

(22) Filed: Mar. 14, 2007

(65) Prior Publication Data

US 2007/0227284 A1    Oct. 4, 2007

(30) Foreign Application Priority Data

Mar. 28, 2006    (JP) .............................. 2006-087551

(51) Int. Cl.
*F16H 59/00* (2006.01)
*F16H 61/00* (2006.01)
*F16H 63/00* (2006.01)
*F16H 59/04* (2006.01)
*B60K 20/00* (2006.01)

(52) U.S. Cl. .................................. 74/337.5; 74/473.36
(58) Field of Classification Search ................ 74/337.5, 74/473.36
See application file for complete search history.

(56) References Cited

U.S. PATENT DOCUMENTS 4,726,258 A * 2/1988 Hayashi et al. ............. 475/209
7,357,114 B2 * 4/2008 Taki ........................ 123/198 E
2006/0011006 A1   1/2006 Suzuki et al.

FOREIGN PATENT DOCUMENTS

| DE | 19645791 A1 | 5/1998 |
| GB | 2379251 A * | 3/2003 |
| JP | 07-230741 | 8/1995 |
| JP | 11-115526 | 4/1999 |
| JP | 2004-203313 | 7/2004 |

OTHER PUBLICATIONS

Translation of IDS reference DE 19645791.*
Translation of JP 07230741.*

* cited by examiner

*Primary Examiner*—Tisha D Lewis
(74) *Attorney, Agent, or Firm*—Carrier Blackman & Associates P.C.; William D. Blackman; Joseph P. Carrier

(57) ABSTRACT

A shift drum apparatus is reduced in weight relative to conventional shift drums. The shift drum includes a shift fork, a shift drum main body, and a lid member. The shift fork is slidably mounted on a shift fork support shaft. The shift fork changes a gear position of a transmission mechanism. The shift drum main body is formed into a hollow cylindrical shape. The shift drum main body has an end face on a first side thereof in a cylindrical axis direction that is open to form an opening portion. The shift drum main body further includes a cam groove formed on an outer circumferential surface thereof. An end portion of the shift fork is fitted in this cam groove to allow the shift fork to slide. The lid member is disc-shaped and mounted by being press-fitted in the opening portion of the shift drum main body.

20 Claims, 7 Drawing Sheets

SHIFT DRUM APPARATUS AND TRANSMISSION INCLUDING SAME

CROSS-REFERENCE TO RELATED APPLICATIONS

The present invention claims priority under 35 USC 119 based on Japanese patent application No. 2006-087551, filed on Mar. 28, 2006. The subject matter of this priority document is incorporated by reference herein.

BACKGROUND OF THE INVENTION

1. Field of the Invention

The present invention relates to a shift drum apparatus that changes a gear position of a transmission mechanism. In particular, the present invention relates to the structure of the shift drum which is configured to include, as separate members, the shift drum main body and the lid member.

2. Description of the Background Art

In a transmission mechanism in which a shift drum apparatus is used to change a gear position of a transmission, a cylindrical shift drum that rotates to slide a shift fork well known. In addition, it is well know to manufacture the cylindrical shift drum through casting. In the known transmission, a gear position sensor, which detects the currently selected gear position by detecting an amount of rotation of the shift drum, is connected to an end face on a first end of the shift drum in a cylindrical axis direction. The portion of the end face of shift drum, to which the gear position sensor is connected, is also formed integrally with the shift drum. Such a transmission mechanism is disclosed, for example, in Japanese Patent Laid-open No. Hei 7-230741. Such a shift drum includes a hollow portion at a center thereof for weight reduction. The hollow portion is formed by using a core during casting.

By integrally forming the shift drum through casting as described above, however, attempts to thin the wall of the shift drum to achieve weight reduction might result in a mold shift or similar problems. If such a problem occurs, the wall thickness can become partially excessively thin, resulting in failure to achieve sufficient drum strength for connecting the gear position sensor. There is therefore a problem in that the inability provide a cylinder having a thin the wall results in an increased weight of the shift drum, which, in turn, results in an increased weight of the entire shift drum apparatus.

It is therefore an object of the present invention to provide a shift drum apparatus that is reduced in weight.

SUMMARY

To solve above described problem, a shift drum apparatus according to the present invention is provided which includes a shift fork (e.g., a shift fork support shaft 46 according to an embodiment of the present invention), a shift drum main body, and a lid member. Specifically, the shift fork is slidably mounted on a support shaft. The shift fork changes a gear position of a transmission mechanism. The shift drum main body is formed into a cylindrical shape. The shift drum main body has an end face on a first side thereof in a cylindrical axis direction, the end face being open to form an opening portion. The shift drum main body further includes a cam groove formed on a circumferential surface thereof. An end portion of the shift fork is fitted in this cam groove, and the shift fork is permitted to slide within the cam groove. The lid member is disc-shaped and mounted by being press-fitted in the opening portion of the shift drum main body.

In the shift drum apparatus according to the present invention, a gear position sensor is connected to the lid member. The gear position sensor detects an amount of rotation of the shift drum main body.

The shift drum apparatus according to the present invention further includes a bearing portion (e.g., a needle bearing 48 according to the embodiment of the present invention) that supports an outer peripheral surface of an end portion of the shift drum main body on which the lid member is mounted.

The lid member is disposed inwardly in the cylindrical axis direction relative to a portion of the shift drum main body that is supported by the bearing portion.

In the shift drum apparatus according to the present invention, the shift drum is configured to include, as separate members, the shift drum main body and the lid member. Accordingly, the weight of the lid member can be reduced by forming the lid member to be thin using a press or the like. It is also possible to achieve a sufficient level of strength of the lid member required for connecting the gear position sensor. In addition, the shift drum main body is formed to have the opening portion that is largely open on one end. In making a hollow portion inside the shift drum main body, therefore, it is possible to cast the shift drum main body without using a core, which enables manufacturing at low cost. It is also possible to further reduce the weight of the shift drum main body by machining the hollow portion therein.

Further, the shift drum main body is arranged so that the outer periphery on the side of the shift drum main body, to which the gear position sensor is connected, is supported by the bearing portion. Accuracy of the bearing portion can therefore be enhanced. Further, the lid member is disposed in a position inward of a portion of the shift drum main body supported by the bearing portion in the cylindrical axis direction. This means that the connection portion of the gear position sensor connector to the lid member is also disposed inside the shift drum main body. This shortens an overall length of the shift drum apparatus in the cylindrical axis direction.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Figure 1:
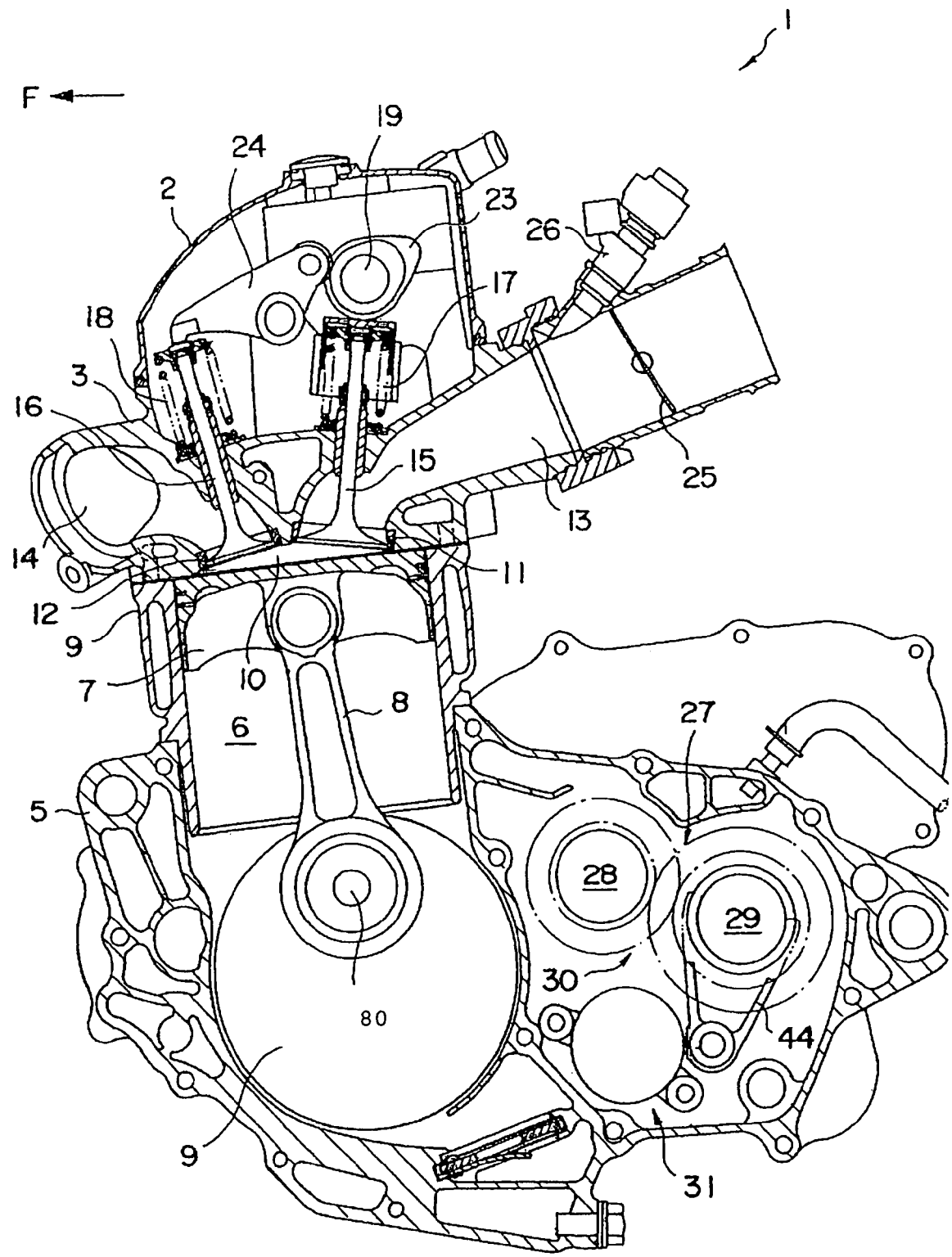
FIG. 1 is a left side sectional view of an engine with which a shift drum apparatus according to an embodiment of the present invention is used.
Figure 2:
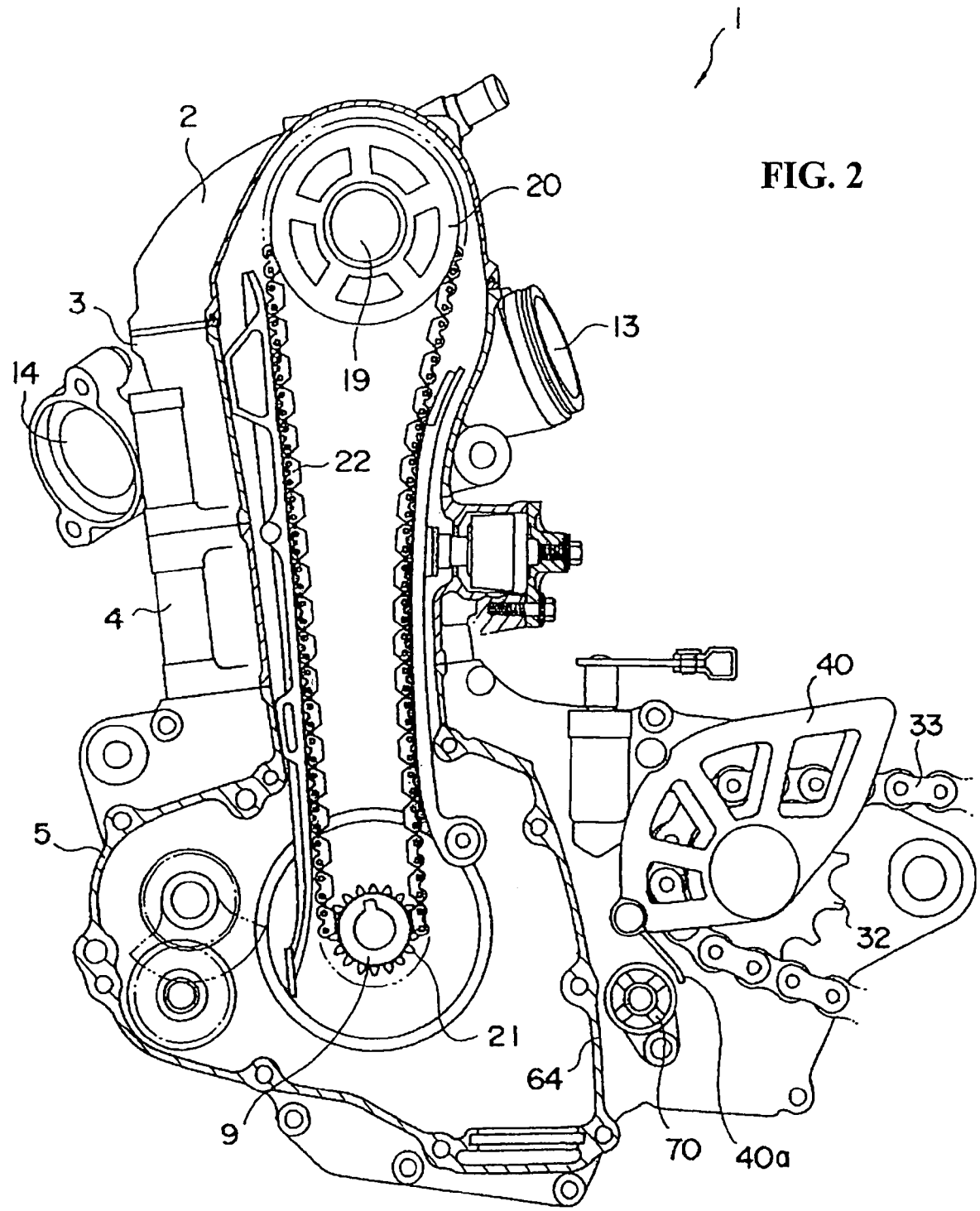
FIG. 2 is a left side partial sectional view of the engine of FIG. 1, illustrating a cam drive mechanism of the engine.
Figure 3:
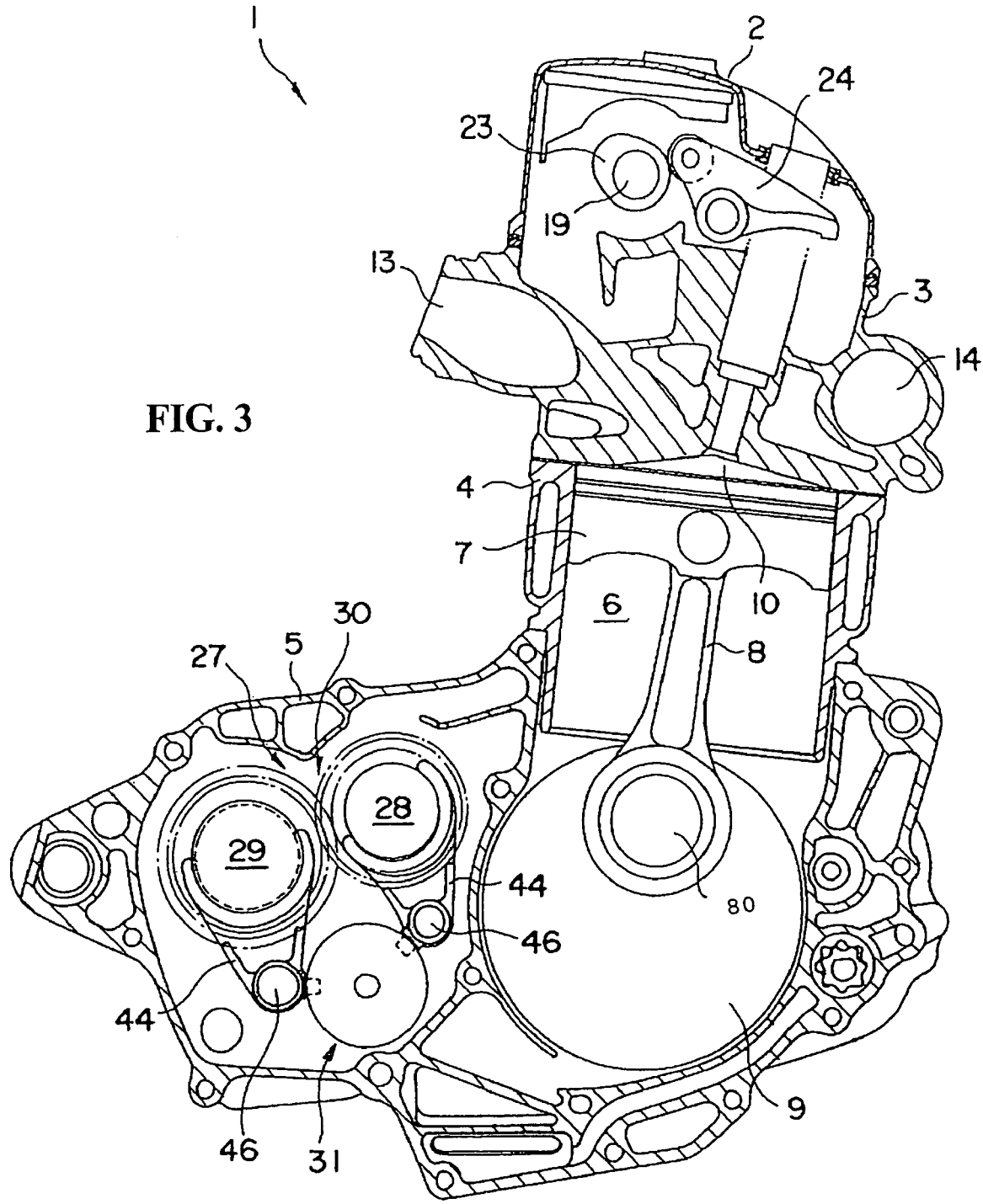
FIG. 3 is a right side sectional view of the engine of FIG. 1, illustrating an arrangement of a main shaft and a countershaft of the engine and the shift drum apparatus.
Figure 4:
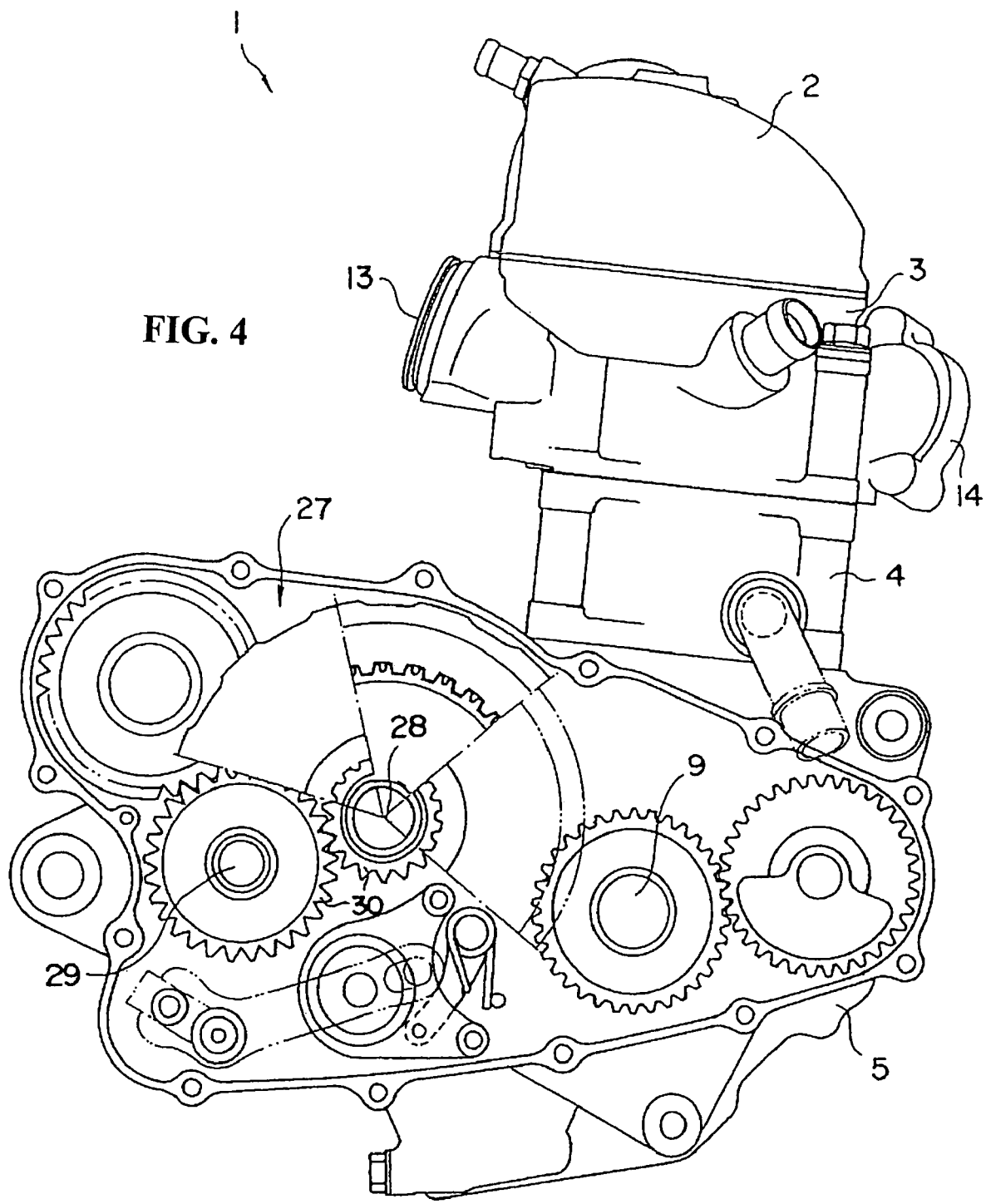
FIG. 4 is a right side partial sectional view of the engine of FIG. 1, illustrating a transmission mechanism of the engine.

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. In the description that follows and in the figures, an arrow F indicates a forward direction of travel of the vehicle, and references to front, rear, left or right directions are as viewed from a forward-facing vehicle operator.

An engine 1, with which a shift drum apparatus according to an embodiment of the present invention is used, will first be described with reference to FIG. 1. The engine 1 is applied to a motorcycle, or more specifically, to a sports motorcycle used for off-road operation.

The engine 1 includes a cylinder head cover 2, a cylinder head 3, a cylinder block 4, and a crankcase 5. A cylinder chamber 6 extending cylindrically vertically is formed in the cylinder block 4. A piston 7 is vertically slidably disposed inside the cylinder chamber 6. The piston 7 is connected via a connecting rod 8 to a crankshaft 9 that is rotatably supported in the crankcase 5. The connecting rod 8 is connected to the crankshaft 9 through a crankpin 80. A combustion chamber 10 is formed by the cylinder chamber 6, the cylinder head 3, and the piston 7. An intake port 13 and an exhaust port 14 are in communication with the combustion chamber 10 via an intake opening 11 and an exhaust opening 12, respectively, formed in the cylinder head 3. Each of an intake valve 15 and an exhaust valve 16 is mushroom-shaped and urged at all times in a direction of closing the intake opening 11 and the exhaust opening 12, respectively, by valve springs 17, 18. Each of the valve springs 17, 18 has a first end supported by a retainer by being fitted to a valve stem and a second end supported by the cylinder head 3.

A camshaft 19 for opening and closing the intake valve 15 and the exhaust valve 16 is rotatably supported in the cylinder head 3. A timing chain 22 is wound around a cam driven sprocket 20 disposed on the camshaft 19 and a cam drive sprocket 21 disposed on the crankshaft 9. Accordingly, the camshaft 19 is rotated in time with the crankshaft 9. A cam 23 formed on the camshaft 19 pushes down the intake valve 15 directly or the exhaust valve 16 indirectly via a rocker arm 24. The intake opening 11 and the exhaust opening 12 are thereby opened or closed.

A throttle valve 25 and an injector 26 are disposed in the intake port 13. The throttle valve 25 adjusts the amount of air that flows through the intake port 13 in a clean state as cleaned by an air cleaner not shown. The air is mixed with fuel injected by the injector 26. A resultant air-fuel mixture is supplied to the combustion chamber 10 from the intake port 13 via the intake opening 11. The mixture is compressed by the piston 7 and ignited by an ignition plug (not shown) to be burned. This generates energy for rotating the crankshaft 9 via the piston 7. An exhaust gas is thereafter discharged to an outside from the exhaust opening 12 by way of the exhaust port 14.

A transmission mechanism 27 is disposed rearward of the crankshaft 9 in the crankcase 5. The transmission mechanism 27 constitutes a parallel shaft transmission, including a main shaft 28, a counter shaft 29, a plurality of gear trains 30, and a shift drum apparatus 31. The main shaft 28 and the counter shaft 29 are disposed in parallel with the crankshaft 9 and are rotatably supported by the crankcase 5. The gear trains 30 are disposed between the main shaft 28 and the counter shaft 29.

The shift drum apparatus 31 engages and disengages gears that make up the gear trains 30 to change a gear ratio (gear position) of the transmission mechanism 27. Rotation of the crankshaft 9 is transmitted to the main shaft 28 via a gear train (not shown). Rotation of the main shaft 28 is then transmitted to the counter shaft 29 at a gear ratio of the gear trains 30 engaged with the main shaft 28 and the counter shaft 29 as selected by the shift drum apparatus 31.

The counter shaft 29 has a left end portion that protrudes to an outside of the crankcase 5. A drive sprocket 32 is mounted to the left end portion. A chain 33 is wound around the drive sprocket 32 and a driven sprocket mounted on a rear wheel shaft (not shown), to form a chain transmission mechanism. Rotation of the counter shaft 29 is transmitted to a rear wheel by the chain transmission mechanism.

An arrangement of the shift drum apparatus 31 will be described with reference to FIG. 5. The shift drum apparatus 31 includes a shift drum main body 34, an input shaft 35, a change pedal 36, a change transfer mechanism 37, an input member 38, a lid member 39, a shift fork 44, and a gear position sensor 70. The shift drum main body 34 is a hollow cylinder in shape, and is disposed such that a cylindrical axis thereof extends substantially in parallel with the crankshaft 9. The input shaft 35 is disposed substantially in parallel with the crankshaft 9 and is rotatably supported on the crankcase 5. The change pedal 36 is disposed on a left end portion of the input shaft 35 (FIG. 6). The change transfer mechanism 37 transmits rotation of the input shaft 35 to the shift drum main body 34. The input member 38 applies the rotation transmitted from the change transfer mechanism 37 to the shift drum main body 34. The lid member 39 is disposed at a left end opening of the shift drum main body 34. The shift fork 44 determines a gear position of the transmission mechanism 27. The gear position sensor 70 is connected to the lid member 39, detecting the gear position selected by the shift drum main body 34.

The shift drum main body 34 includes a plurality of cam grooves 45 formed on an outer peripheral surface thereof. An end portion of the shift fork 44 is fitted in each of the plurality of cam grooves 45. The shift fork 44 is supported slidably in a lateral direction by a shift fork support shaft 46 that is secured to the crankcase 5 and extends substantially in parallel with the crankshaft 9. The shift fork 44 has a leading end portion connected to a dog clutch that engages or disengages the gear trains 30 with or from the main shaft 28 or the counter shaft 29. When the change pedal 36 is depressed to rotate the shift drum main body 34, the shift fork 44 is moved in the lateral direction according to the cam grooves 45, so that the dog clutch is operated. The gear trains 30 are thereby engaged with, or disengaged from, the main shaft 28 or the counter shaft 29, so that the gear position is selected.

Figure 5:
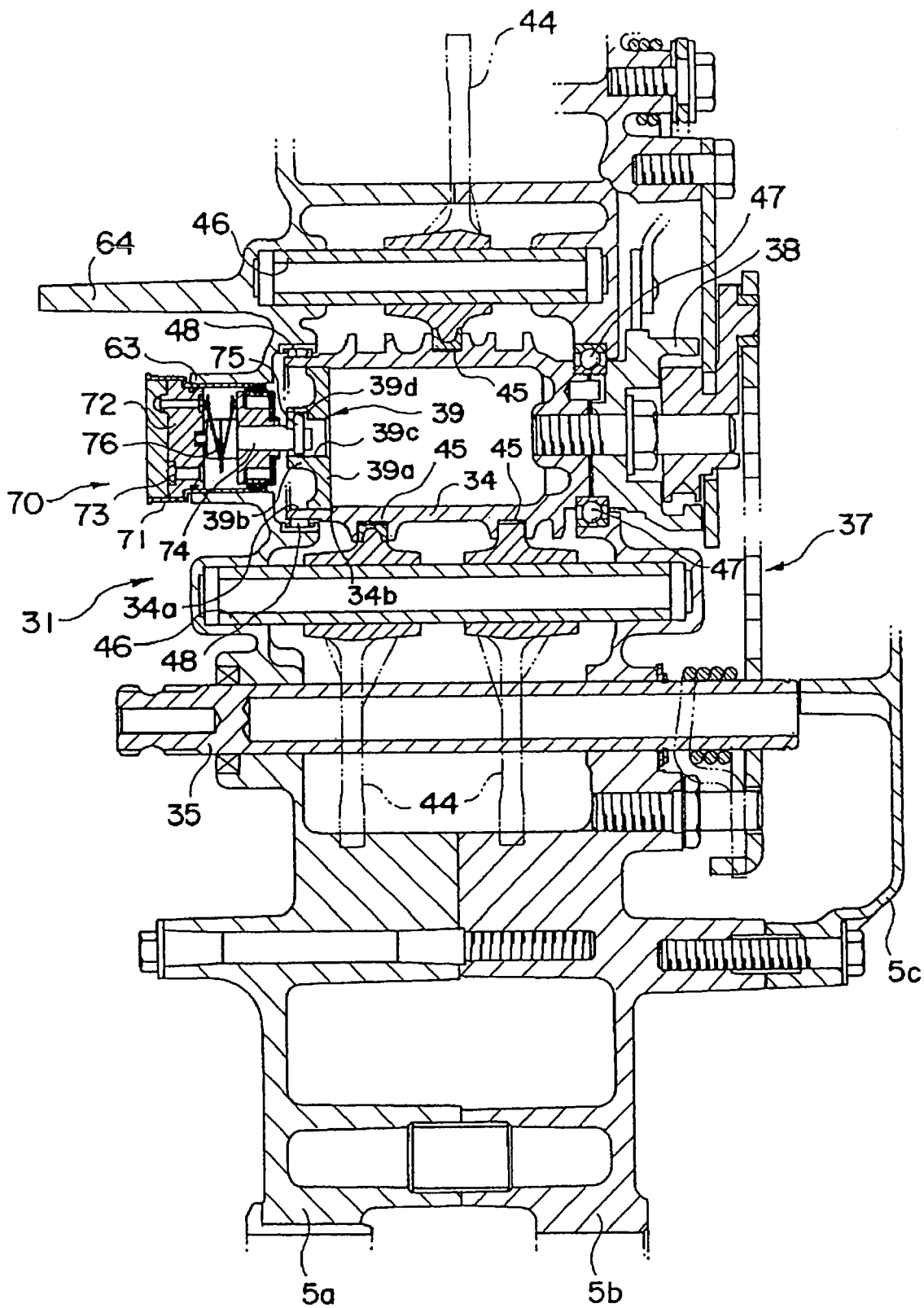
FIG. 5 is a sectional view showing a principal portion of the shift drum apparatus.
Figure 6:
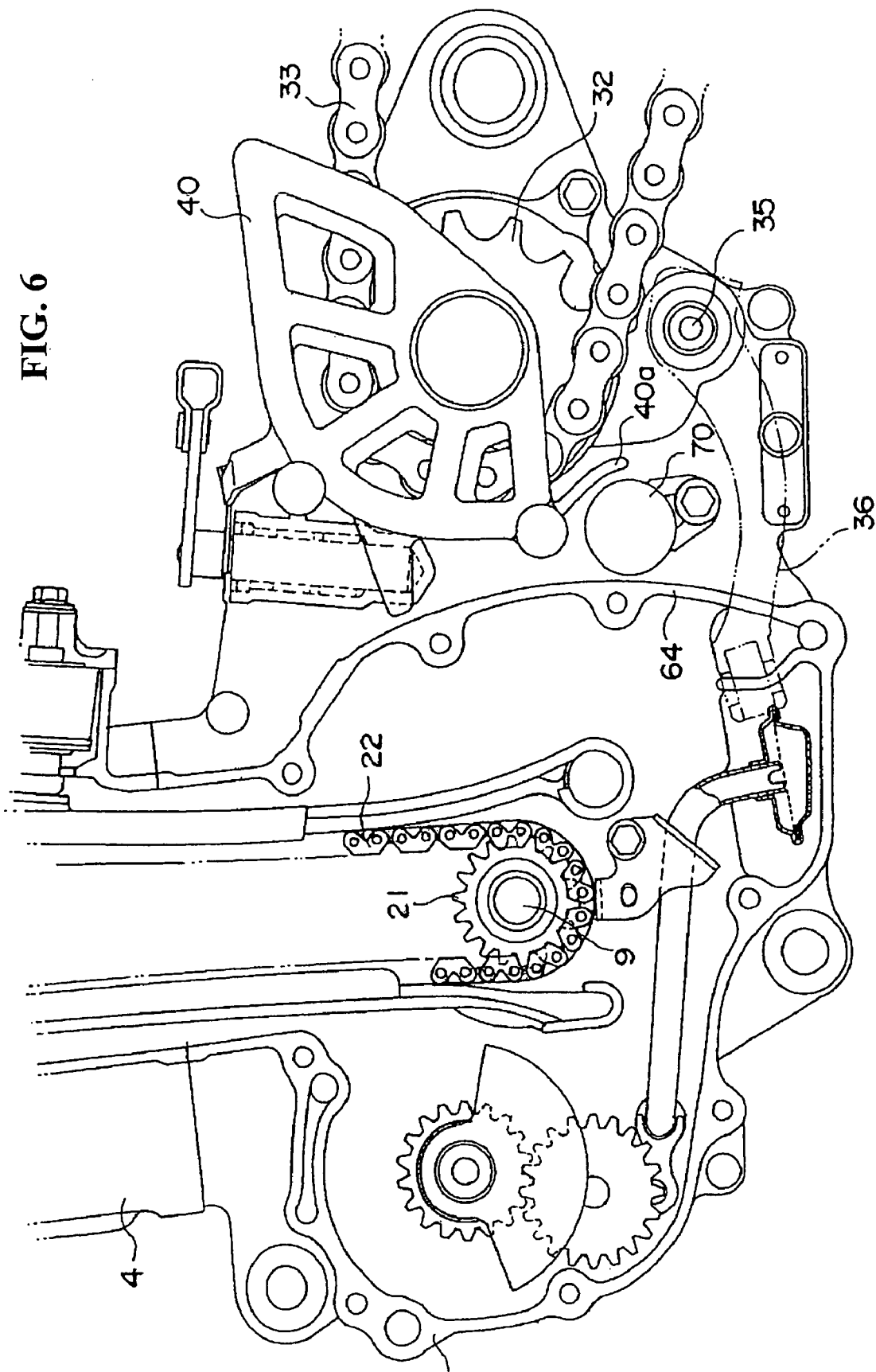
FIG. 6 is an enlarged left detail sectional view of a portion of the cam drive mechanism of FIG. 2, showing a principal portion for illustrating an arrangement of a gear position sensor.

In the engine 1 according to the embodiment of the present invention, the crankcase S includes, as shown in FIG. 5, a left case half body 5a and a right case half body 5b. The crankcase 5 further includes a left cover member (not shown) covering a left surface portion of the left case half body 5a, and a right cover member 5c covering a right surface portion of the right case half body 5b. An outer peripheral surface of a right end portion of the shift drum main body 34 is rotatably supported by the right case half body 5b via a ball bearing 47. Further, an outer peripheral surface of a left end portion of the shift drum main body 34 is rotatably supported by the left case half body 5a via a needle bearing 48.

The aforementioned input member 38 is connected to a right end side of the shift drum main body 34. A left end side of the shift drum main body 34 is open to form an opening portion 34a. The lid member 39 is connected to an inside surface of the shift drum main body 34 at a location coinciding with the opening portion 34a. The lid member 39 includes a disc-shaped flange portion 39a and a cylindrical connection portion 39b that extends coaxially with the shift drum main body 34 from a center of the flange portion 39a. The opening portion 34a on the left end side of the shift drum main body 34 is formed to have an inside diameter substantially equivalent to the size (outer diameter) of the flange portion 39a. The opening portion 34a further includes a step portion 34b at which the inside diameter of the shift drum main body 34 is reduced so as to have an inside diameter smaller than that of the opening portion 34a. The step portion 34b is formed at a position just to the right of a portion of the shift drum main body 34 supported via the needle bearing 48. The lid member 39 is press-fitted in the opening portion 34a and pushed all the way up to a point before the step portion 34b. The lid member 39 is thereby fixed in position in the shift drum main body 34 having the arrangements as described above.

The left case half body 5a supports the left end portion of the shift drum main body 34, and includes a cylindrical sensor mounting portion 63 formed thereon. The sensor mounting portion 63 is a cylindrical boss that protrudes leftward in alignment with a cylindrical axis of the shift drum main body 34, extending laterally outward from the left case half body 5a. The gear position sensor 70 is installed in the sensor mounting portion 63 by being inserted thereinto.

The gear position sensor 70 includes a sensor case 71, a terminal base 72, a plurality of terminals 73, a rotational shaft 74, a fixing pin 75, and a contact plate 76. The sensor case 71 includes a terminal fixing portion 71a and a detector portion 71b. Specifically, the terminal fixing portion 71a has an outer diameter that is substantially equivalent to an outside diameter of the cylindrical sensor mounting portion 63. The detector portion 71b has an outer diameter that is substantially equivalent to an inside diameter of the sensor mounting portion 63. The terminal base 72 is mounted to the terminal fixing portion 71a of the sensor case 71. The terminals 73 are mounted in the terminal base 72. The rotational shaft 74 protrudes outwardly from the detector portion 71b of the sensor case 71 and a proximal end thereof is rotatably held in the detector portion 71b. The fixing pin 75 is disposed at a distal (leading) end portion of the rotational shaft 74 so as to protrude in a direction perpendicular to a rotational axis of the rotational shaft 74. The contact plate 76 is disposed inside the detector portion 71b, and rotates in concert with the rotational shaft 74.

The connection portion 39b of the lid member 39 fitted to the shift drum main body 34 includes a through hole 39c that extends laterally (in a direction of the rotational axis) formed therein. An insertion slit 39d is formed in a leading end portion (left end portion) of the through hole 39c. The insertion slit 39d is cut internally from an opening portion.

The lid member 39 and the rotational shaft 74 are connected together as follows. Specifically, the rotational shaft 74 of the gear position sensor 70 mounted in the sensor mounting portion 63 is inserted into the through hole 39c. The fixing pin 75 disposed at the leading end portion of the rotational shaft 74 is then inserted into the insertion slit 39d. Accordingly, the rotational shaft 74 is rotated via the fixing pin 75 according to rotation of the shift drum main body 34, which varies the condition of contact between the contact plate 76 and the terminals 73. As a result, by detection of the amount of rotation of the shift drum main body 34, the gear position sensor 70 is allowed to detect the gear position selected by the shift drum apparatus 31.

As described in the foregoing, the shift drum of the shift drum apparatus 31 is configured to include, as separate members, the shift drum main body 34 and the lid member 39. Accordingly, the weight of the lid member 39 is reduced by thinning the lid member using a press or the like. It is also possible to achieve the required level of strength of the lid member 39 for connecting the gear position sensor 70 thereto. In addition, the shift drum main body 34 is formed to have the opening portion 34a that is largely open on the left end side. In making a hollow portion inside the shift drum main body 34, therefore, it is possible to cast the shift drum main body 34 without using a core, which enables manufacturing at low cost. It is also possible to further reduce weight of the shift drum main body 34 by machining the hollow portion therein. Accordingly, as compared with a case in which the shift drum main body and lid are integrally cast as a single entity, each separate member can be made thinner, thus contributing to a reduced weight of the shift drum apparatus 31.

The side (left end side) of the shift drum main body 34, to which the rotational shaft 74 is connected, is arranged such that the needle bearing 48 supports the outer periphery of the shift drum main body 34. Bearing accuracy by the needle bearing 48 can therefore be enhanced. Further, the lid member 39 is press-fitted in a position to the right (inward side of the shift drum main body 34) of a portion of the shift drum main body 34 supported by the needle bearing 48. This means that the connection portion 39b of the lid member 39 is also disposed inside the shift drum main body 34. As a result, the rotational shaft 74 of the gear position sensor 70 is also disposed inside the shift drum main body 34, whereby an overall lateral length of the shift drum apparatus 31 is shortened.

Referring to FIG. 1 and related drawings, the shift drum apparatus 31 is disposed below a position between the main shaft 28 and the counter shaft 29. Referring to FIG. 6, the gear position sensor 70 is disposed near a position downward of the drive sprocket 32 fitted to the left end portion of the counter shaft 29. When the gear position sensor 70 is mounted in the sensor mounting portion 63, the detector portion 71b of the sensor case 71 is inserted in the sensor mounting portion 63, while the terminal fixing portion 71a of the sensor case 71 protrudes outwardly. As a result, mud and other contaminants may be flung from the chain 33 wound around the drive sprocket 32 and deposited on the gear position sensor 70, thus rendering the gear position sensor 70 inoperative. Further, since the gear position sensor 70 is mounted to protrude leftward from the crankcase 5 (left case half body 5a), gravel and the like flung by a front wheel may directly impact and damage the sensor 70.

Figure 7:
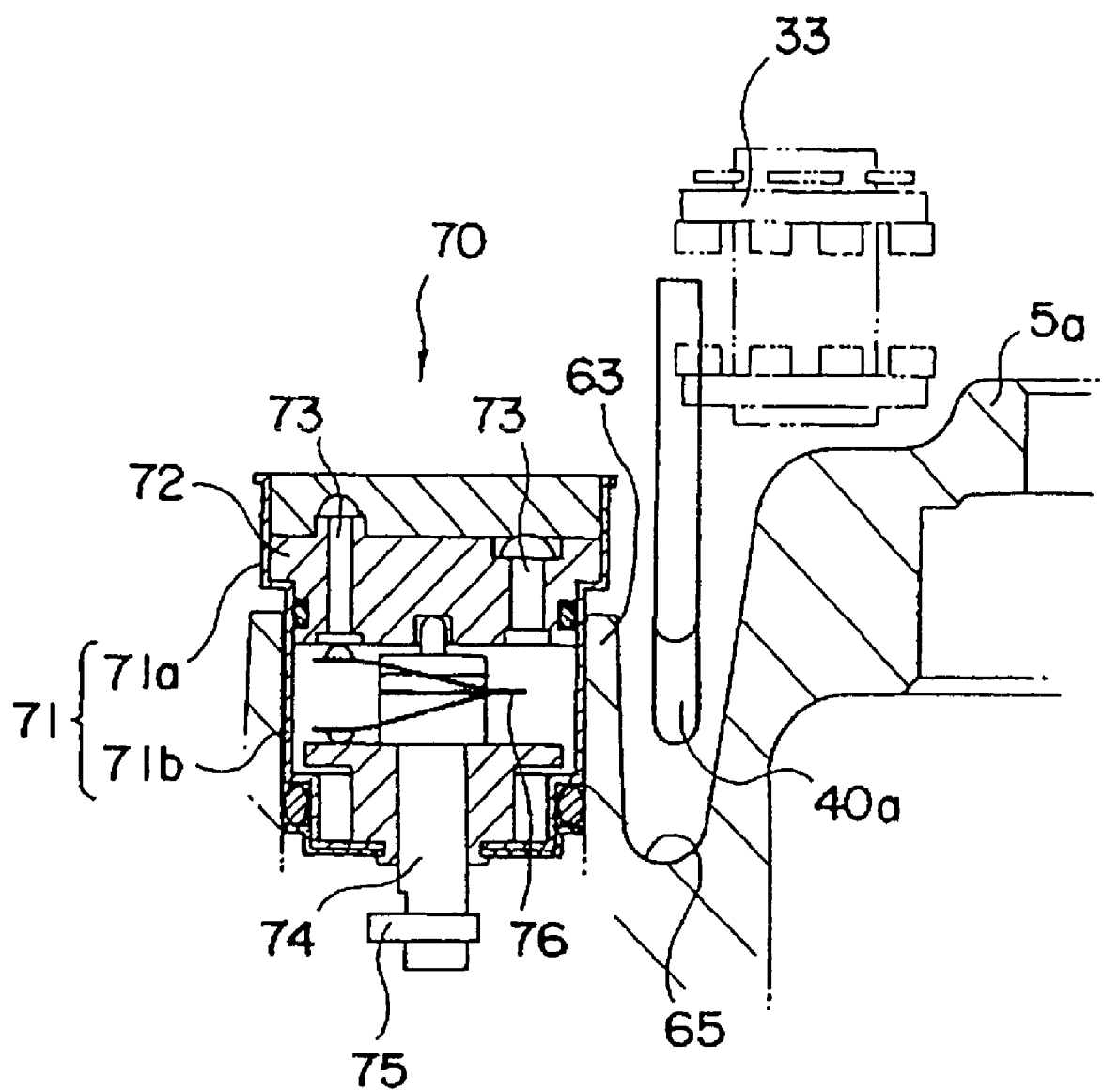
FIG. 7 is a cross-sectional view showing an enlarged illustration of the gear position sensor.

As a prevention against the mud flung from the chain 33, a sprocket cover 40, mounted so as to cover the drive sprocket 32 on a left side surface of the crankcase 5, is provided for protection of the drive sprocket 32. The sprocket cover 40 includes a sheet-like mud guard portion 40a formed thereon. Referring to FIGS. 6 and 7, the mud guard portion 40a is formed to be disposed between the drive sprocket 32 (chain 33) and the gear position sensor 70 when the sprocket cover 40 is mounted to the crankcase 5. Referring to FIG. 6, the mud guard portion 40a is extended from an area upward of the gear position sensor 70 obliquely downwardly toward an area rearward of the sensor 70 so as to cover a rear side of the sensor 70. Further, the mud guard portion 40a has a leading end portion curved to extend downwardly. Mud or the like flung from the chain 33 falls downwardly along the mud guard portion 40a and is not likely to be deposited on the gear position sensor 70.

A groove portion 65 is formed in a side portion of the sensor mounting portion 63 of the left case half body 5a. Referring to FIG. 7, when the sprocket cover 40 is mounted to the left case half body 5a, the mud guard portion 40a is designed to enter the groove portion 65. Accordingly, the mud guard portion 40a covers the entire side portion of the gear position sensor 70. It is therefore possible to reliably prevent mud or the like, flung from the chain 33, from being deposited on the gear position sensor 70.

A rib 64 for accommodating the cam drive sprocket 21 mounted to the crankshaft 9 and the like is formed to protrude leftward from the left case half body 5a on a side forward of the gear position sensor 70. A left cover member not shown is mounted on a left end side of the rib 64. Accordingly, the rib 64 and the left cover member cover the front side of the gear position sensor 70 in a front view. There is therefore an arrangement for protecting the gear position sensor 70 from gravel and the like flung by the front wheel.

As described in the foregoing, the rib 64, formed on the left case half body 5a, and the mud guard portion 40a, formed on the sprocket cover 40, are configured to surround the gear position sensor 70 mounted on the crankcase 9. This eliminates the need for providing a special cover for the gear position sensor 70. Further, the mud guard portion 40a included in the sprocket cover 40 not only eliminates the need for extra man-hours required for mounting the mud guard portion 40a, but also reduces the number of parts used.

While a working example of the present invention has been described above, the present invention is not limited to the working example described above, but various design alterations may be carried out without departing from the present invention as set forth in the claims.

What is claimed is:

1. A transmission mechanism, the transmission mechanism comprising:
    a plurality of gears adapted to be configured in a plurality of gear positions,
    a shift drum apparatus;
    a support shaft;
    a shift fork slidably mounted on the support shaft, the shift fork provided for selectively changing a gear position;
    a transmission case body, said transmission case body comprising:
        a left case half body portion;
        a right case half body portion;
        a sensor housing portion; and
        a groove portion;
            wherein the sensor housing portion and the groove portion are formed in an external surface of one of the half body portions;
    a gear position sensor mounted in said sensor housing portion; and
    a mud guard member mounted on one of the half body portions, a portion of the mud guard member configured to fit within a space formed in the groove portion and to substantially shield a portion of the side portion of the gear position sensor;
    the shift drum apparatus comprising:
        a shift drum main body formed into a hollow cylindrical shape, the shift drum main body having an end face on a first side thereof in a cylindrical axis direction, the end face open to form an opening portion, the shift drum main body having a cam groove formed on a circumferential surface thereof, an end portion of the shift fork being fitted in the cam groove such that the shift fork is allowed to slide in the cam groove; and
        a disc-shaped lid member press-fit into the opening portion of the shift drum main body, wherein said disc-shaped lid member is formed separately from the shift drum main body.

2. The transmission mechanism according to claim 1, wherein the gear position sensor detects an amount of rotation of the shift drum main body, and is connected to the lid member.

3. The transmission mechanism according to claim 1, the transmission mechanism further comprising:
    a bearing which supports an outer peripheral surface of an end portion of the shift drum main body on which the lid member is mounted.

4. The transmission mechanism according to claim 3, wherein the lid member is disposed in the opening portion of the shift drum main body at a location that is inward in the cylindrical axis direction relative to the bearing.

5. The transmission mechanism according to claim 1, wherein the lid member comprises a disc shaped flange portion and a cylindrical connection portion,
    the connection portion protruding from a center of the flange portion in a direction normal to a side of the flange portion such that when the lid member is mounted on the shift drum main body, the connection portion is coaxial with the cylindrical axis direction of the shift drum main body.

6. The transmission mechanism according to claim 1, wherein the lid member comprises a disc shaped flange portion and a cylindrical connection portion,
    the connection portion protruding from a center of the flange portion, and
    the flange portion comprising an outer diameter that is substantially equivalent to the inside diameter portion of the opening portion.

7. The transmission mechanism according to claim 1, wherein the lid member comprises a disc shaped flange portion,
    the flange portion comprising an outer diameter that is substantially equivalent to the inside diameter portion of the opening portion.

8. The transmission mechanism according to claim 1, wherein the lid member comprises a disc shaped flange portion,
    the flange portion comprising an outer diameter that is substantially equivalent to the inside diameter portion of the opening portion,
    the transmission mechanism further comprises a bearing which supports an outer peripheral surface of an end portion of the shift drum main body on which the lid member is mounted, and
    the shift drum main body comprising:
        a first inner diameter corresponding to the opening portion;
        a second inner diameter; and
        a step portion formed in an inner surface of the shift drum main body providing a transition between portions of the inner surface having the first inner diameter and portions of the inner surface having the second inner diameter,
    wherein the flange portion is disposed in the opening portion of the shift drum main body at a location that is between the bearing and the step portion.

9. The transmission mechanism according to claim 1, wherein
    the lid member comprises a disc shaped flange portion and a connection portion,
    the connection portion comprises an annular protrusion protruding from a center of the flange portion in a direction normal to a side of the flange portion such that when the lid member is mounted on the shift drum main body, the protrusion is coaxial with the cylindrical axis direction of the shift drum main body, the protrusion comprising an inner wall surface having a slot formed therein, wherein the gear position sensor is operable to detect an amount of rotation of the shift drum main body, the gear position sensor comprising a rotational shaft, a portion of the rotational shaft extending into the protrusion, and wherein a portion of the rotational shaft projects into the slot, whereby the shift drum main body, the lid member, and the rotational shaft rotate in concert such that rotation of the shift drum is detected by the gear position sensor.

10. The transmission mechanism according to claim 1, the transmission mechanism further including a housing, a first bearing, and a second bearing, wherein the first bearing disposed between the housing and the shift drum main body so as to support an end portion of the shift drum main body on which the lid member is mounted, the first bearing comprising a needle bearing, the second bearing disposed between the housing and the shift drum main body so as to support an end portion of the shift drum main body that is opposed to the end portion of the shift drum main body on which the lid member is mounted, the second bearing comprising a ball bearing.

11. The transmission mechanism according to claim 1, wherein the gear position sensor detects an amount of rotation of the shift drum main body, and is connected to the lid member, the sensor housing portion comprises a sensor mounting portion disposed adjacent to end face of the shift drum main body, the sensor mounting portion comprising a cylindrical boss that protrudes in alignment with the cylindrical axis of the shift drum main body so as to extend laterally outward from housing, wherein the gear position sensor is disposed in the sensor mounting portion.

12. A shift drum for use in changing gears in a vehicle transmission, the shift drum comprising:

a shift drum main body formed into a hollow cylindrical shape, an input shaft disposed substantially in parallel with a crankshaft, said input shaft rotatably supported on a crankcase;

a change pedal disposed on an end portion of the input shaft;

a change transfer mechanism for transmitting rotation of the input shaft to the shift drum main body;

a shift fork configured to determine a gear position of a transmission mechanism; the shift fork slidably supported in a lateral direction by a support shaft, said support shaft secured to the crankcase and extending substantially in parallel with the crankshaft;

a gear position sensor configured to detect the gear position selected by the shift drum main body;

the shift drum main body comprising:

an end face on a first side thereof in a cylindrical axis direction, the end face open to form an opening portion; and a plurality of cam grooves formed on an outer circumferential surface thereof, the shift drum further comprising a disc-shaped lid member press-fit into the opening portion of the shift drum main body, wherein said disc-shaped lid member is formed separately from the shift drum main body; and wherein the lid member in an entirety thereof is disposed in the opening portion inwardly of the end face of the shift drum main body.

13. The shift drum according to claim 12, wherein the gear position sensor which detects an amount of rotation of the shift drum main body is connected to the lid member.

14. The shift drum apparatus according to claim 12, wherein the lid member is disposed in the opening portion of the shift drum main body at a location that is spaced inward in the cylindrical axis direction relative to the end face such that a portion of said gear position sensor connected to the lid member is disposed in the shift drum main body.

15. The shift drum according to claim 12, wherein the lid member comprises a disc shaped flange portion and a cylindrical connection portion, the connection portion protruding from a center of the flange portion in a direction normal to a side of the flange portion such that when the lid member is mounted on the shift drum main body, the connection portion is coaxial with the cylindrical axis direction of the shift drum main body.

16. The shift drum according to claim 12, wherein the lid member comprises a disc shaped flange portion, the flange portion comprising an outer diameter that is substantially equivalent to an inside diameter portion of the opening portion.

17. The shift drum according to claim 12, wherein the lid member comprises a disc shaped flange portion, the flange portion comprising an outer diameter that is substantially equivalent to an inside diameter portion of the opening portion, and the shift drum main body comprising:

a first inner diameter corresponding to the opening portion;

a second inner diameter; and a step portion formed in an inner surface of the shift drum main body providing a transition between portions of the inner surface having the first inner diameter and portions of the inner surface having the second inner diameter, wherein the flange portion is disposed in the opening portion of the shift drum main body at a location that is between the end and the step portion.

18. The shift drum according to claim 17, wherein the lid member further comprises a cylindrical connection portion, the connection portion protruding from a center of the flange portion in a direction normal to a side of the flange portion such that when the lid member is mounted on the shift drum main body, the connection portion is coaxial with the cylindrical axis direction of the shift drum main body, wherein the flange portion is disposed in the opening portion of the shift drum main body at a location such that the connection portion is disposed inside the shift drum main body.

19. A transmission mechanism, the transmission mechanism comprising:

a plurality of gears adapted to be configured in a plurality of gear positions, a shift drum apparatus;

a support shaft; and a shift fork slidably mounted on the support shaft, the shift fork changing a gear position;

the shift drum apparatus comprising:

a shift drum main body formed into a hollow cylindrical shape, the shift drum main body having an end face on a first side thereof in a cylindrical axis direction, the end face open to form an opening portion, the shift drum main body having a cam groove formed on a circumferential surface thereof, an end portion of the shift fork being fitted in the cam groove such that the shift fork is allowed to slide in the cam groove; and a disc-shaped lid member press-fit into the opening portion of the shift drum main body;

the transmission mechanism further comprising a bearing which supports an outer peripheral surface of an end portion of the shift drum main body on which the lid member is mounted.

20. The transmission mechanism according to claim 19, wherein the lid member is disposed in the opening portion of the shift drum main body at a location that is inward in the cylindrical axis direction relative to the bearing.

* * * * *